Feb. 2, 1943.  R. J. FISHER  2,309,890
COUPLING DEVICE FOR PIPES
Filed Feb. 28, 1940   2 Sheets-Sheet 1
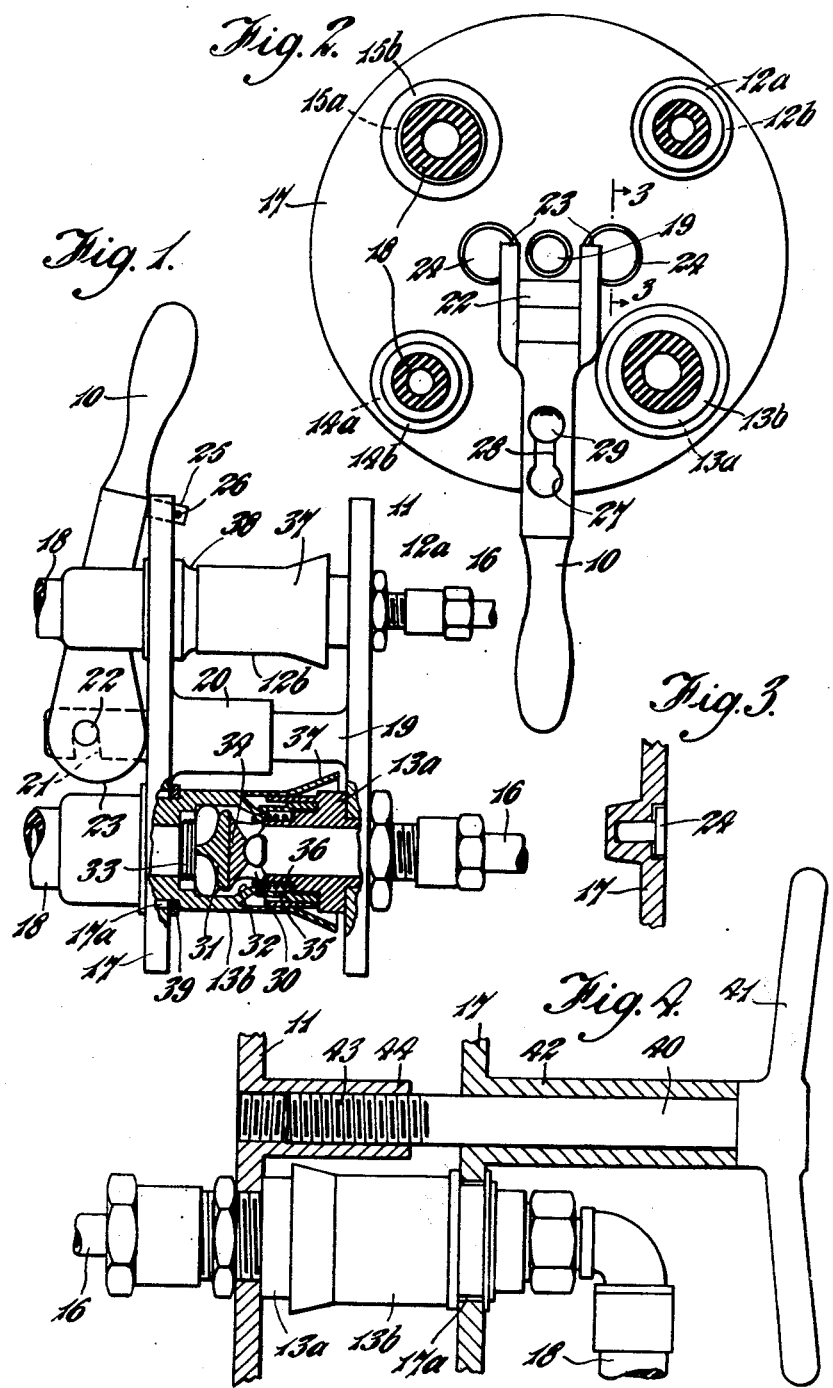

Feb. 2, 1943.  R. J. FISHER  2,309,890
COUPLING DEVICE FOR PIPES
Filed Feb. 28, 1940  2 Sheets-Sheet 2
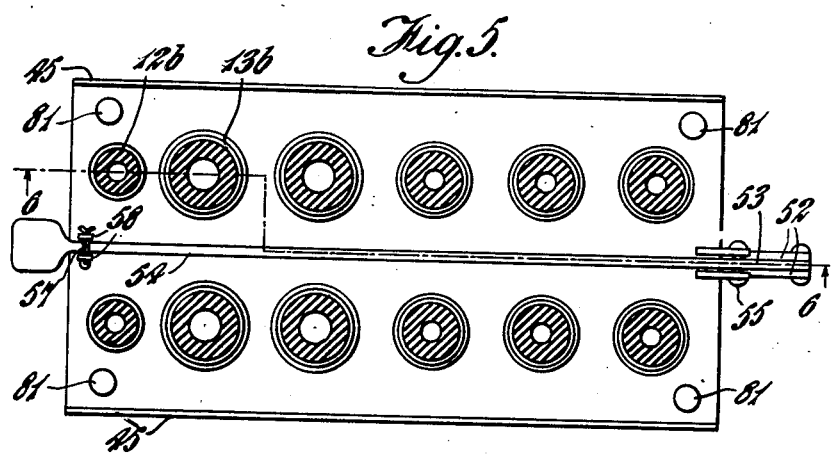
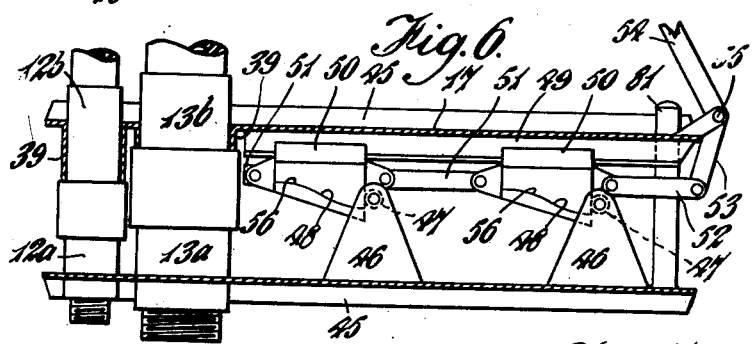
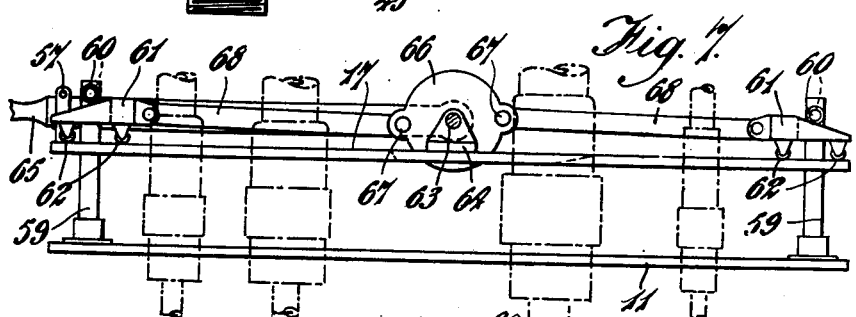
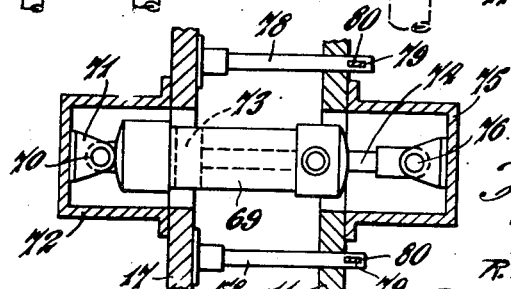
Inventor:
R. J. Fisher
By Stevens & Davis
Attys.

Patented Feb. 2, 1943

2,309,890

UNITED STATES PATENT OFFICE 2,309,890

COUPLING DEVICE FOR PIPES

Reginald John Fisher, London, England, assignor to Avery Equipment Limited, London, England Application February 28, 1940, Serial No. 321,322
In Great Britain March 16, 1939

12 Claims. (Cl. 284—18)

This invention relates to coupling devices for pipes, and more especially to those of the kind in which one or each of the two elements comprising the coupling is fitted with a valve device adapted to be opened automatically by the action of clamping the two coupling elements together.

Coupling devices of this kind are commonly employed in circumstances where a mechanical component, such, for example, as an engine, frequently has to be removed from its operating position for overhauling. This usually entails the uncoupling of numerous pipe connections, especially in the case of aircraft engines where one or more pumps are normally driven by the engine for the purpose of creating liquid pressure for remote control systems. It is the object of the present invention to provide an improved form of coupling device for enabling several pipe connections to be broken simultaneously when desired, said coupling device being arranged to restore the pipe connections in an equally simple and expeditious manner.

According to the invention a coupling device is provided comprising a pair of support members, each carrying one element of each of a plurality of valved pipe couplings, and clamping means for drawing said support members together, so that corresponding pairs of coupling elements are simultaneously united, and the valves therein opened by the drawing together of the said support members.

Thus the improved coupling device may comprise a pair of support members, clamping means for urging said support members towards one another, and a plurality of pipe couplings, each of which latter consists of a pair of coupling elements both having valves which are arranged to close the respective conduit ends when the said elements are separated, the coupling elements being carried by the support members so that as the latter are brought together in correct register, the coupling elements on one support member engage with the corresponding coupling elements carried by the other support member.

According to a further aspect of the invention there is provided a coupling device for connecting simultaneously the coupling elements of a plurality of pipe couplings which are arranged with their axes mutually parallel and have valves for closing the conduit ends when the coupling elements are separated, said device comprising a pair of plate-like support members having holes within which the coupling elements are secured, and clamping means for drawing said support members towards one another so as to bring the corresponding pairs of coupling elements into full engagement simultaneously.

Preferably the clamping means comprises a tightening device operating between one of the support members and a projection, which latter is carried by the other support member and is arranged to act in tension, said projection conveniently extending through the said one clamping member in order to engage with the tightening device. The clamping means may comprise one or more rectilinearly movable wedge members or an angularly movable cam member, said clamping means in the preferred arrangements being operated by an angularly movable arm. Alternatively, however, the clamping means may comprise one or more screw threaded members which are arranged so that when rotated they draw the support members towards one another.

As a further modification the clamping means comprises one or more cylinder and piston units connected with the support members and arranged to draw the latter together when said unit or units are supplied with pressure fluid. Where pipe couplings of different sizes are installed between the same pair of support members, collars may be provided between the smaller coupling elements and one or both of the support members so as to enable all of the couplings to reach their fully engaged positions simultaneously.

In one arrangement a plurality of wedge members are disposed between support members, and are arranged to move along a rail provided upon one of said members, overhanging projections carried by the other support member being engaged by the oblique surfaces of said wedge members for the purpose of pulling the support members towards one another.

Several examples of coupling devices according to the invention are shown in the accompanying drawings, in which:

Figure 1 is a side elevation, partly in section, showing a coupling device which is tightened by means of an angularly movable cam;

Figure 2 is a front elevation corresponding to Figure 1;

Figure 3 is a fragmentary sectional elevation of a constructional feature taken on the line 3—3 of Figure 2;

Figure 4 is a sectional side elevation of a modified form of tightening means;

Figure 5 is a front elevation of another form of coupling device;

Figure 6 is an inverted sectional plan taken on the line 6—6 of Figure 5;

Figure 7 is a similar view showing another form of tightening means; and

Figure 8 is a fragmentary sectional elevation showing a piston and cylinder unit used as a clamping device.

The device shown in Figures 1 to 3 is arranged to enable the elements of four pipe couplings to be manipulated simultaneously and locked in engagement by the manipulation of a single operating lever or arm indicated at 10. The device is particularly suitable for use in connection with aircraft engines for enabling the usual pipe connections to the fuselage to be readily disconnected and reconnected by a simple operation, at the same time making sure that the correct connections are made. A support member 11 is in the form of a plate which is adapted to be attached to the usual engine bulkhead of the fuselage and is fitted with a number of coupling elements indicated at 12a, 13a, 14a and 15a. Pipes denoted generally by the reference 16 lead of course to the appropriate parts of aircraft, such, for example, as to the instrument board and to the customary liquid pressure remote control system of the aircraft. The complementary coupling elements 12b, 13b, 14b and 15b are carried by another support member 17, which normally extends parallel with the support member 11, flexible pipes indicated generally at 18 being fastened to the said coupling elements and being arranged to lead to the engine and/or its attached accessories. The support member 11 is provided at its centre with a rod-like projection 19 with which a guide bush 20 upon the support member 17 is adapted to engage slidably. The free end of the projection 19 is notched from below and at a slight inclination as shown at 21 in Figure 1 for the reception of a pin 22 serving as the pivot of the actuating arm 10. The corresponding end of the latter is bifurcated to fit around the projection 19 and is shaped eccentrically or otherwise to provide a pair of cam surfaces 23 designed to produce the desired tightening action. These cam surfaces bear against the support member 17 conveniently through the medium of wear-resisting and friction-reducing studs 24, the construction and arrangement of which will be clearly seen in Figure 3. The arm 10 is provided with a projection 25 adapted to receive a pin, seal or other device 26 for the purpose of holding the arm 10 in its clamped position.

When it is desired to release the couplings the device 26 is removed and the arm 10 swung in an anti-clockwise direction, thus releasing the pressure which is created by the cam surfaces 23. At the end of approximately 180° of movement the rounded part 27 of a key-hole-shaped opening 28 formed in the arm 10 engages over a headed pin 29 secured to the support member 17. Subsequent downward movement of the arm 10 causes the latter to be positively retained by the pin 29 and at the same time disengages the pivot pin 22 from the projection 19. This of course enables the support member 17, together with the arm 10 and the associated coupling elements 12b, 13b, 14b and 15b to be drawn clear of the projection 19 and the corresponding coupling elements 12a, 13a, 14a and 15a.

The pipe couplings are of the form in which one or each of the coupling elements is provided with a valve adapted to close the conduit automatically as the coupling is disengaged and to open when the elements are again fully brought together. One of the couplings is shown diagrammatically in section in Figure 1 and is of the form described in United States patent application Serial No. 302,586, filed November 2, 1939. As illustrated the elements 13a and 13b are in their fully engaged position, a relatively free passageway 30 for liquid or other fluid being provided through the coupling. The coupling element 13b contains a valve member 31 which is urged towards an inwardly directed seat 32 by means of a coiled compression spring 33, the said valve member 31 being urged off its seating 32 by a head member 34 rigidly carried by the coupling element 13a. The valve member of the latter comprises an axially slidable sleeve 35 which is urged outwards by a coiled compression spring 36, the extremity of the sleeve 35 engaging with the margin of the head 34 when the coupling elements are disengaged. In the position shown, however, the said sleeve 35 is held in its retracted position by engagement with that part of the element 13b adjacent the seating 32. Suitable packings are of course provided where necessary to prevent leakage of fluid. The coupling element 13b is formed also with a bell-shaped shroud 37 which serves to protect the vital parts of the coupling and also acts as a guide to bring the elements into register.

The couplings as at present made naturally vary in length for different sizes of conduit, and as it is important that all the couplings should reach their fully engaged state simultaneously, spacing washers or collars 38 and 39 are provided between the coupling elements and the support member 17 as shown in Figure 1. Thus the coupling 13a, 13b is longer in length when fully engaged than is the coupling 12a, 12b, and therefore the washer or collar 39 is correspondingly shorter in axial length than the washer or collar 38. The coupling elements 12b, 13b, 14b and 15b are mounted in the support member 17 with clearance, as indicated at 17a, so as to have a limited amount of lateral freedom for allowing the elements to align themselves freely with the elements upon the support member 11.

In the constructional modification shown in Figure 4 the clamping means for drawing together the support members 11 and 17 comprises a rod 40 which is provided with a handle or wheel 41 whereby it can be easily turned within a bush 42 provided upon the support member 17. The opposite end of the rod 40 is screw threaded at 43 and engages within a screw threaded bush 44 formed upon the support member 11, the two bushes 42 and 44 being relatively long so that the rod 40 serves to maintain the support members 11 and 17 in parallel relationship. It will be appreciated that by unscrewing the rod 40 from the bush 44 the elements of the couplings, one of which latter is indicated at 13a, 13b are drawn apart, thus allowing the coupling valves to close, and when the rod 40 is completely disengaged from the bush 44, the support member 17 with its accompanying coupling elements can be removed from the support member 11. In a coupling device of the general form shown in Figures 1 and 2 it is probable that only one screw threaded rod 40 would be used, but in cases where the support members 11 and 17 are relative large so as to accommodate an increased number of couplings, a plurality of screw threaded rods 40 may be provided.

In another form of coupling device as shown in Figures 5 and 6, the support members 11 and 17 are in the form of relatively thin metal plates which are flanged at 45 to produce stiffness and are provided as before with coupling elements, two pairs of which are indicated at 12a, 12b and 13a, 13b. Guide rods 81 extend from the support member 11, through holes in the support member 17 so as to keep said support members in register. Collars 39 or equivalent bushes are provided in connection with or upon the support member 17 so as to enable pipe couplings of different axial lengths to reach their fully engaged positions simultaneously as the support members 11 and 17 are drawn together. For effecting this operation and holding the couplings in their engaged position the support member 11 is provided upon its "interior" surface with a plurality of upwardly extending lugs 46, conveniently three in number. Each of these carries at its apex an overhanging projection or roller 47 which is engageable by an oblique cam track 48 carried by the support member 17 and adapted to act in the manner of a wedge. As will be seen in Figure 6, the support member 17 is provided upon its underneath with a rail 49 conveniently of inverted T-shape in cross section, and this rail serves for supporting slidably a plurality of members 50, from the lower parts of which project the wedge-like cam surface. 48. The sliding members 50 are connected together by links 51 and a pair of terminal links 52 join the adjacent sliding member to the lower part 53 of an operating arm 54 which is pivoted to the support member 17 at 55. Thus when the arm 54 is raised to the position shown in 56, the cam surfaces 48 are free from the projections or rollers 47 and the support member 17 can be separated from the support member 11. To unite the couplings the parts are brought to the positions shown in Figure 6, and when the arm 54 is depressed the cam surfaces 48 draw the support member 17 downwards towards the support member 11, thus uniting the coupling elements and opening the valves therein. Each of the cam surfaces 48 is provided with a horizontal terminal portion 56 to prevent the support members 11 and 17 from springing apart of their own accord, while the arm 54 is further provided with locking means comprising a pin 57 arranged to be passed through a pair of projections 58 between which the arm 54 lies.

A modified arrangement operating upon a wedge principle is indicated diagrammatically in Figure 7, in which the support member 11 is provided at opposite ends with projecting rods 59, which carry at their upper parts, pairs of rollers indicated at 60. Wedge members 61 which are substantially U-shaped in plan are fitted with rollers 62, permitting them to move freely upon the upper surface of the support member 17. The wedge members 61 are operated by a transverse spindle 63 which is fitted in bearing 64 upon the support member 17 and is actuated by an arm 65. The spindle 63 is fitted with a crank member 66, diametrically opposite parts of which are pivoted at 67 to connecting rods or links 68 joined to the wedge members 61. The support members 11 and 17 are locked together when the parts occupy the positions shown in Figure 7 and it will be seen that the pivots 67 are just beyond their dead centre position so that the force developed by the couplings due to their internal springs and to the pressure of the liquid is unable to displace the wedge members 61. The arm 65 is, however, locked in position by means of a pin 57 as in the preceding example. To release the couplings the pin 57 is removed and the arm 65 is turned in a clockwise sense, thus causing the connecting rods 68 to withdraw the wedge members 61 from below the rollers 60. The support member 17 can then be removed by lifting it away from the projections 59. If desired guiding means (not shown) can be incorporated for preventing the connecting rods 68 and/or the wedge members 61 from leaving their proper positions when the support members 11 and 17 are separated, thus ensuring that the wedge members 61 are ready to enter beneath the rollers 60 when the support member 17 is again placed in position upon the projections 59.

Another method of drawing the support members 11 and 17 together for the purpose of uniting the couplings consists in utilising fluid pressure, such, for example, as the pressure liquid which is commonly used for the remote control systems of an aircraft. One arrangement is shown in Figure 8 and in this case the support member 17, besides carrying the usual coupling elements (not shown), is provided at one or more positions with cylinder members 69 conveniently pivoted at 70 between lugs 71 provided upon the bottom of a cup-shaped member 72. The cylinder contains a piston 73 which is connected by a piston rod 74 to a similar cup-shaped member 75 upon the support member 11. A readily removable pin 76 enables the piston rod 74 to be disconnected from the support member 11 when it is desirable to remove the latter. Pressure liquid is fed through an inlet 77, and in forcing the piston 73 towards the left it draws the support members 11 and 17 together, thus closing the couplings associated with said members. If desired mechanical locking means may be provided in order to ensure that the support members 11 and 17 cannot separate if the pressure supply to the cylinder 69 should be shut off or otherwise fail, and in the arrangement shown in Figure 8 rods 78 firmly secured to the support member 17 project through holes in the support member 11. Slots 79 are formed in the end parts of the rods 78 to receive flat wedges 80.

The invention thus provides an extremely simple and compact form of device, which enables a large number of couplings to be disposed within a small space and to be connected and disconnected simultaneously in an extremely easy manner. The clamping means can readily be suited to the space that is available, and this is a decided advantage in aircraft where the various components are inevitably crowded into a small space.

What I claim is:

1. A coupling device comprising, a plurality of valved pipe couplings, a pair of support members each carrying one element of each pipe coupling so that as the support members are moved toward one another the elements of each coupling engage one another coaxially, and means for drawing the support members positively toward one another comprising a projection which is carried firmly by one support member, and a cam device engageable with said projection so that movement of the cam relative to the support member by which it is carried draws the coupling elements into full engagement.

2. A coupling device as claimed in claim 1, in which the projection extends through the said other support member, a cam and lever device being provided to engage the end of said projection and engage with the said other support member so that angular movement of the lever slides the said other support member along the projection.

3. A coupling device comprising, a plurality of valved pipe couplings, a pair of support members, each carrying one element of each pipe coupling so that as the support members are moved toward one another the elements of each coupling engage one another coaxially, and a hydraulic piston and cylinder unit operatively connected between the support members to draw these toward one another, releasable positive locking means being provided to hold the coupling elements in full engagement.

4. A coupling device comprising a plurality of valved pipe couplings, a pair of support members, each carrying one element of each of said couplings, positive means for drawing the support members non-resiliently toward one another, said means being arranged to act simultaneously upon the support members at a plurality of positions which are spaced apart in two dimensions so as to maintain the support members in mutually parallel planes during the whole of said drawing together movement, and an axially slidable valve member in each of said coupling elements, the valve members of each pair of elements being arranged to butt together so as to exclude substantially all air and at the same time produce a fluid-tight joint between the coupling elements during the first part of the movement of the support members toward one another, the remainder of said movement serving to open the valves and produce passageways through the couplings.

5. A coupling device as claimed in claim 1, wherein a plurality of spaced projections are provided upon one support member, and wherein a plurality of spaced cam devices carried upon the other support member are engageable with said projections to positively draw the support members toward one another and at the same time maintain them in parallel relationship.

6. A coupling device comprising, a plurality of valved pipe couplings, a pair of support members each carrying one element of each pipe coupling so that as the support members are moved toward one another the elements of each coupling engage one another coaxially, and means for drawing the support members positively towards one another comprising a plurality of spaced projections which are carried firmly by one support member, and a plurality of cam devices carried by the other support member and arranged to be moved in unison so as first to engage with the respective projections and then to draw the support members towards one another, at the same time maintaining said support members in truly parallel relationship.

7. A coupling device as claimed in claim 6, wherein the cam devices are rectilinearly guided and are connected together mechanically so that they move in the same direction and by equal amounts in drawing the support members toward one another.

8. A coupling device as claimed in claim 6, wherein the cam devices are rectilinearly guided, upon one of the support members, and are connected with actuating mechanism comprising an angularly movable spindle, cranks carried by said spindle, and link members connecting the cranks wtih the said cam devices.

9. A coupling device comprising, a plurality of telescoping valved pipe couplings, a pair of parallel support plates each carrying one element of each of said couplings, aligned axially slidable normally closed valve members, one in each of said coupling elements, an operating means for drawing said plates together, said operating means including at least a pair of aligned interengaging projections, the projections constituting a pair extending from opposite plates in a direction toward one another, each projection being supported from its respective plate, and positive means for non-resiliently reducing the effective cumulative length of at least a pair of said projections to draw said plates toward one another, at least one of the projections of each pair constituting a part of said positive means, said valve members being recessed in said coupling elements so that the corresponding coupling elements are first brought into engagement coaxially in pairs to produce a fluid-tight seal one with another, and then further drawing together of the support plates causes the valve members to axially move to open position to produce passageways through the couplings.

10. A coupling device comprising, a plurality of telescoping valved pipe couplings of different axial lengths, a pair of parallel support plates each receiving therethrough one element of each of said couplings, sleeves interposed between at least one support plate and the coupling elements passing therethrough, said sleeves serving to space the ends of the coupling elements with respect to the plate, aligned axially slidable normally closed valve members, one in each of said coupling elements, and operating means for drawing said plates together, said operating means including at least a pair of aligned interengaging projections, the projections constituting a pair extending from opposite plates in a direction toward one another, each projection being supported from its respective plate, and positve means for non-resiliently reducing the effective cumulative length of at least a pair of said projections to draw said plates toward one another, at least one of the projections of each pair constituting a part of said positive means, said valve members being recessed in said coupling elements so that the corresponding coupling elements are first brought into engagement coaxially in pairs to produce a fluid-tight seal, one with another, and then further drawing together of the support plates causes the valve members to axially move to open position to produce passageways through the couplings, the lengths of the sleeves being such that all of the valve members of the couplings attain their fully opened position simultaneously.

11. A coupling device comprising, a plurality of valved pipe couplings, a pair of support plates, each carrying one element of each of said couplings, operating means for drawing said plates together, said operating means including at least a pair of aligned interengaging projections, the projections constituting a pair extending from opposite plates in a direction toward one another, each projection being supported from its respective plate, positive means for non-resiliently reducing the effective cumulative length of at least a pair of said projections to draw said plates toward one another, at least one of the projections of each pair constituting a part of said positive means, and an axially slidable valve member in each of said coupling elements, the valve members of each pair of elements being arranged to butt together so as to exclude substantially all air and at the same time produce a fluid-tight joint between the coupling elements during the first part of the movement of the support plates toward one another, the remainder of said movement serving to open the valves and produce passageways through the couplings.

12. A coupling device comprising, a plurality of valved pipe couplings, a pair of support plates, each carrying one element of each of said couplings, operating means for drawing said plates together, said operating means including at least a pair of aligned interengaging projections, the projections constituting a pair extending from opposite plates in a direction toward one another, each projection being supported from its respective plate, positive means for non-resiliently reducing the effective cumulative length of at least a pair of said projections to draw said plates toward one another, at least one of the projections of each pair constituting a part of said positive means, means apart from the couplings for retaining the support plates in mutually parallel planes during the whole of said drawing together movement, and an axially slidable vlave member in each of said coupling elements, the valve members of each pair of elements being arranged to butt together so as to exclude substantially all air and at the same time produce a fluid-tight joint between the coupling elements during the first part of the movement of the support plates toward one another, the remainder of said movement serving to open the valves and produce passageways through the couplings.

REGINALD JOHN FISHER.